Figure 12:
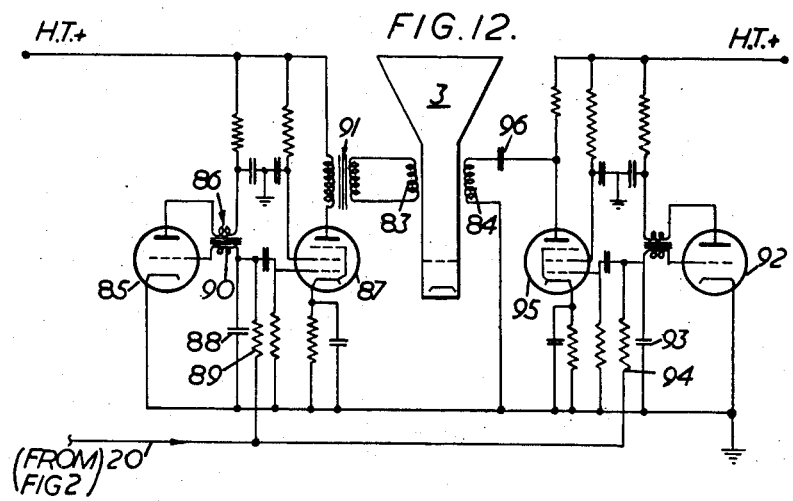

July 3, 1962  A. R. KILMINSTER  3,041,932
PHOTOGRAPHIC COLOUR REPRODUCTION APPARATUS
Filed Sept. 18, 1958  7 Sheets-Sheet 1
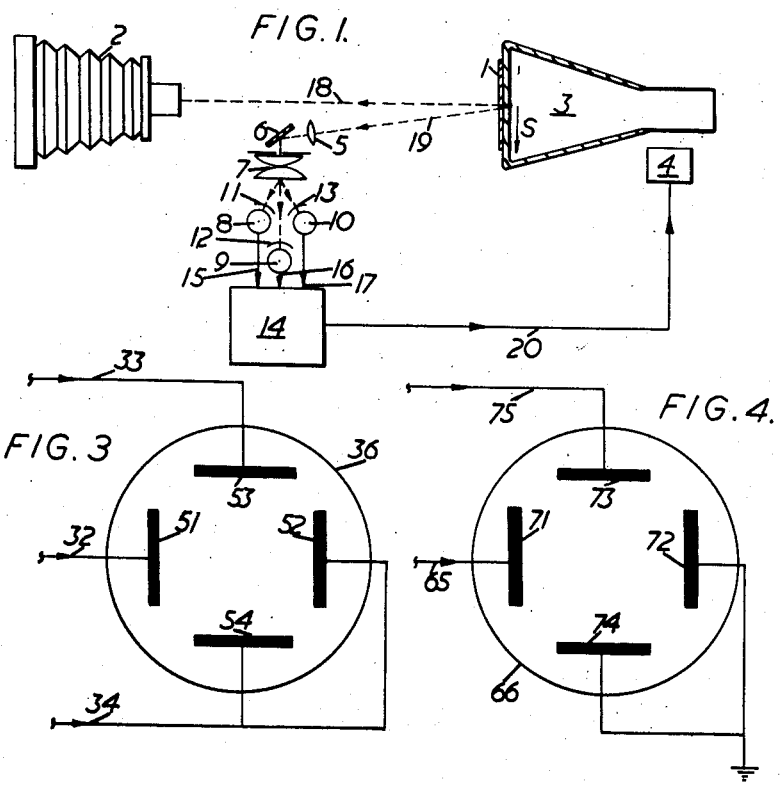
Inventor
ARTHUR R. KILMINSTER
By
Attorneys

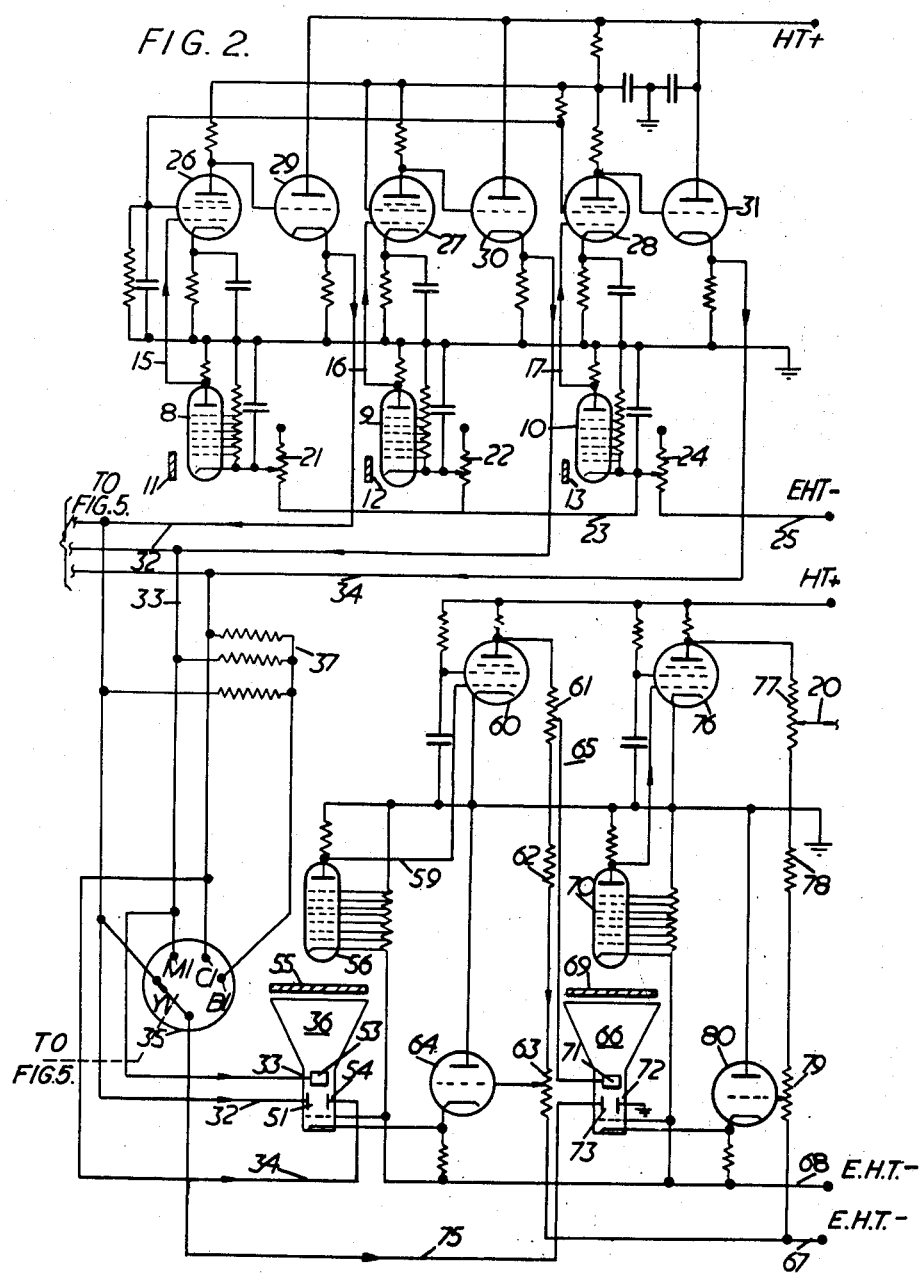

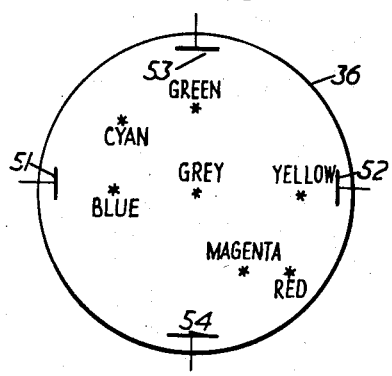
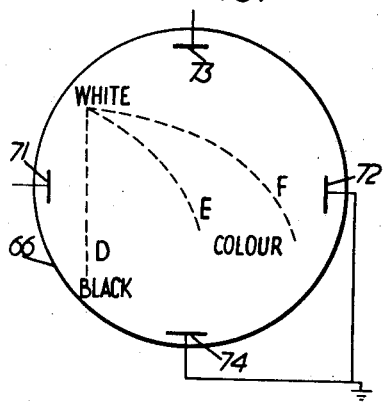
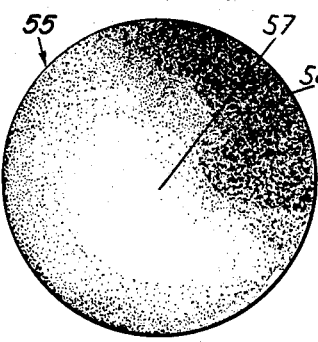
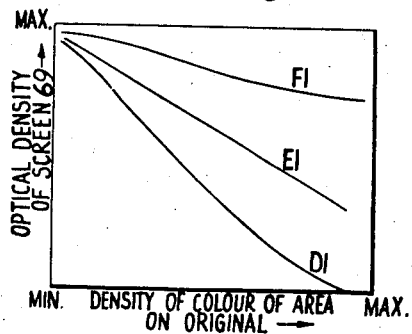
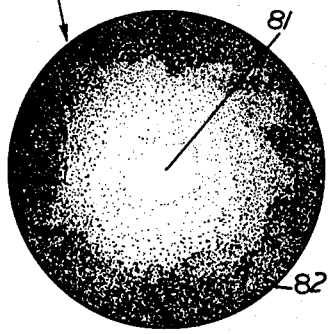
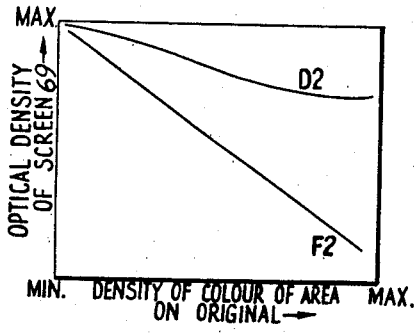

*Inventor*
ARTHUR R. KILMINSTER
By *Imirie & Smiley*
Attorneys

July 3, 1962 A. R. KILMINSTER 3,041,932
PHOTOGRAPHIC COLOUR REPRODUCTION APPARATUS
Filed Sept. 18, 1958 7 Sheets-Sheet 5

Inventor
ARTHUR R. KILMINSTER
By Imirie & Smiley
Attorneys

Inventor
ARTHUR R. KILMINSTER
By Imrie & Smiley
Attorneys

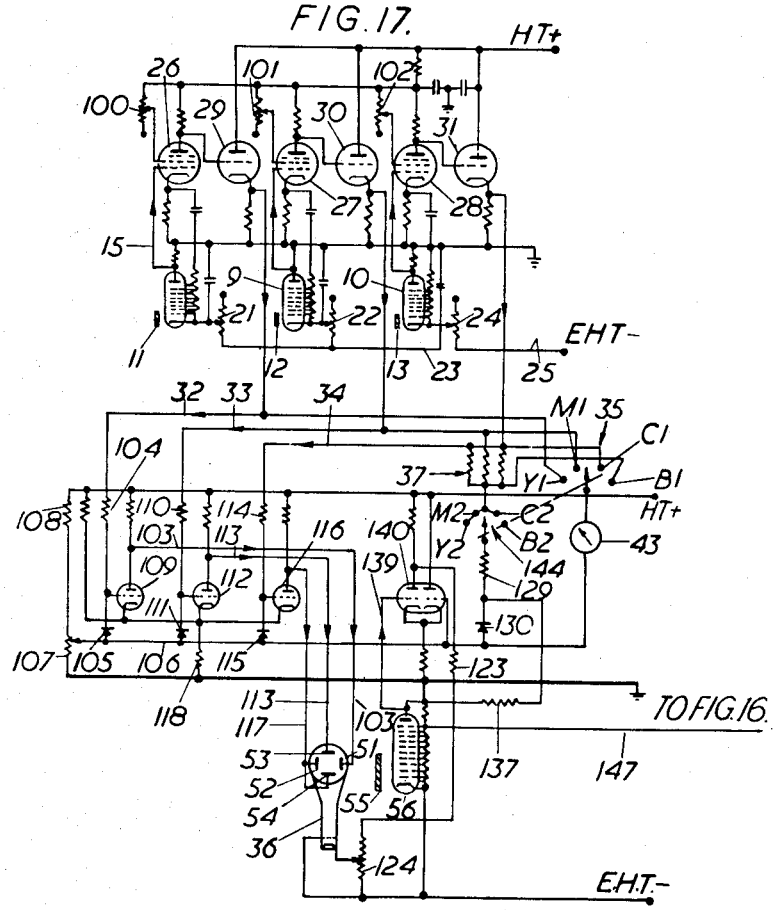

United States Patent Office 3,041,932
Patented July 3, 1962

3,041,932
PHOTOGRAPHIC COLOUR REPRODUCTION
APPARATUS
Arthur R. Kilminster, Birmingham, England, assignor to
Hunter-Penrose Limited, London, England, a British
company
Filed Sept. 18, 1958, Ser. No. 761,878
Claims priority, application Great Britain Sept. 24, 1957
25 Claims. (Cl. 88—24)

This invention relates to photographic colour reproduction apparatus, and in particular to apparatus for use in the preparation of colour separation photographic negatives which are corrected for both colour and tone.

According to the invention there is provided photographic colour reproduction apparatus, comprising a scanning cathode ray tube operable to direct a spot of substantially white light on to a coloured original, time base circuits connected to deflector means for the scanning cathode ray tube and operable to form a scanning raster on the face thereof to effect sequential scanning of the original, and control means connected to the time base circuits and arranged to be activated by the primary colour components of light transmitted from the original as a result of the scanning thereof to control modulation of the speed of scan of the scanning raster thereby to control the amount of light transmissible from the original.

The deflector means for the scanning cathode ray tube may comprise line scan deflector coils and frame scan deflector coils with line and frame time base circuits respectively connected thereto, the control means being connected to the line and frame time base circuits to modulate the speed of scan of the scanning spot.

In a preferred embodiment of the invention the control device comprises a first, a second and a third photoelectric device having respectively associated therewith a blue, a green and a red filter through which light transmitted from an original passes to activate said devices, an analysing cathode ray tube having deflector means responsive to electrical signals originating as outputs from the photoelectric devices to determine the position of a spot of light on the face of the tube, a fourth photoelectric device operable in response to light from said spot of light to control modulation of the speed of scan of the scanning raster, and a selecting screen having a predetermined optical density for each area thereon interposed between the analysing cathode ray tube and the fourth photoelectric device to vary the intensity of the light received by the fourth photoelectric device according to the position of the spot of light on the face of the analysing tube.

The term "photographic plate" used herein is intended to include a photographic film.

Figure 13:
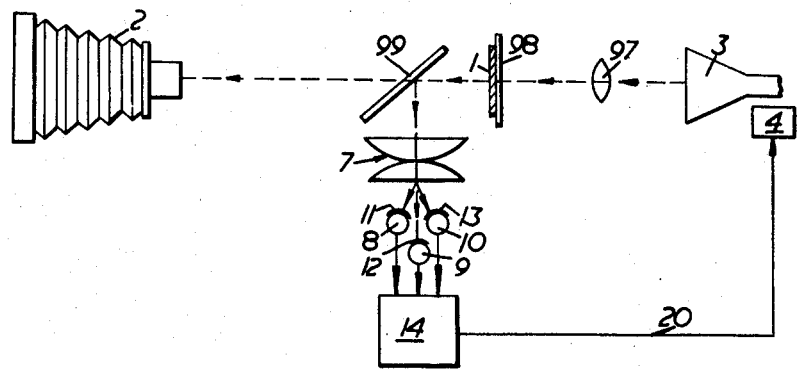
Figure 14:
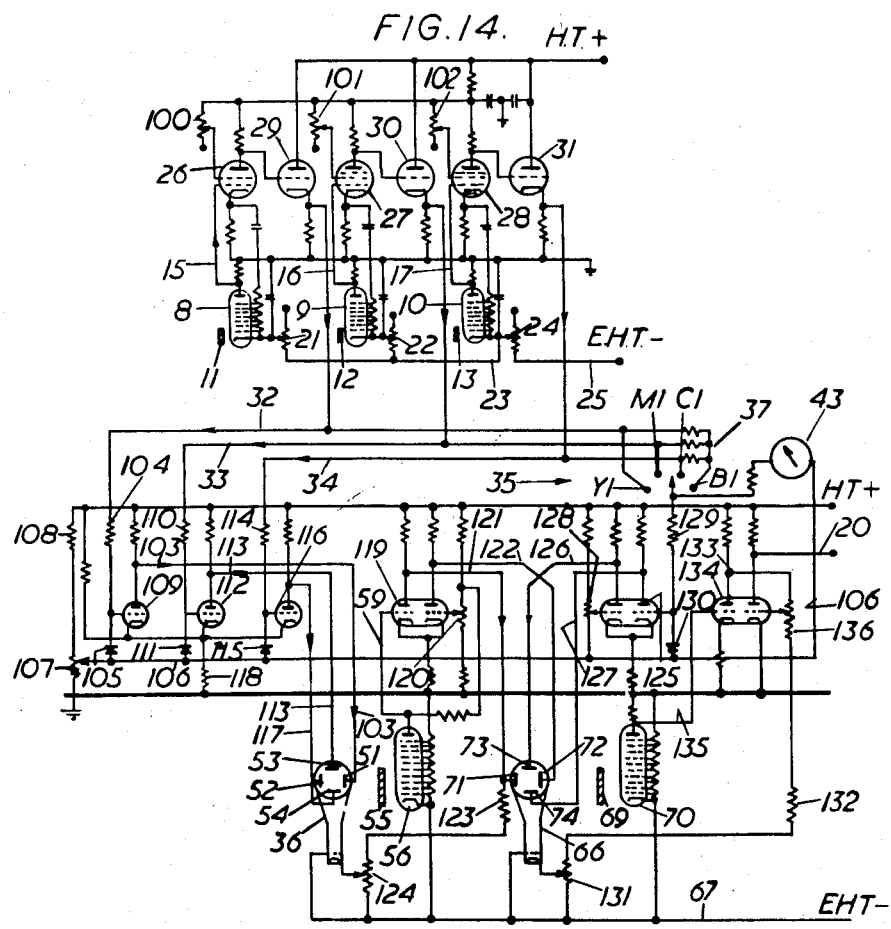
Figure 15:
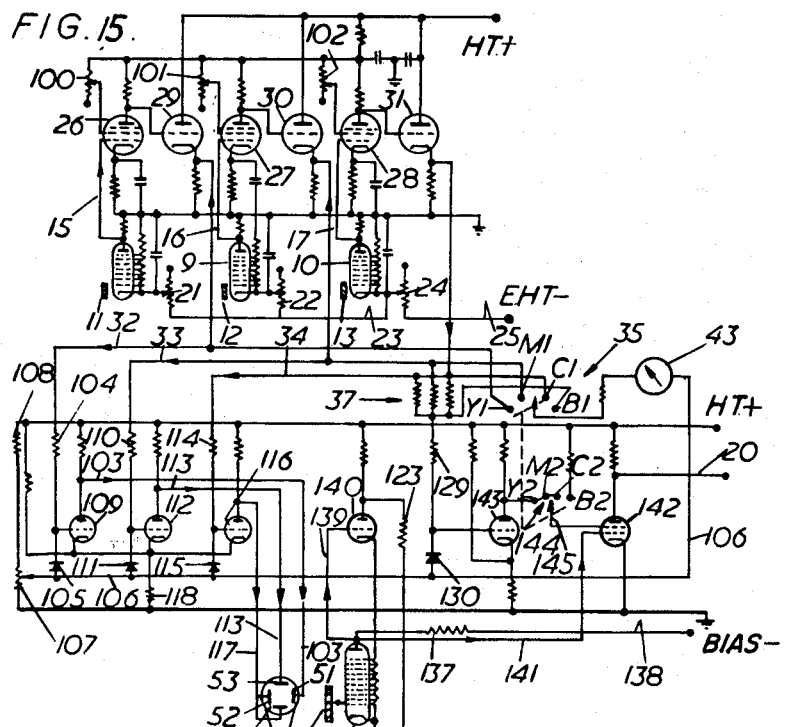
Figure 16:
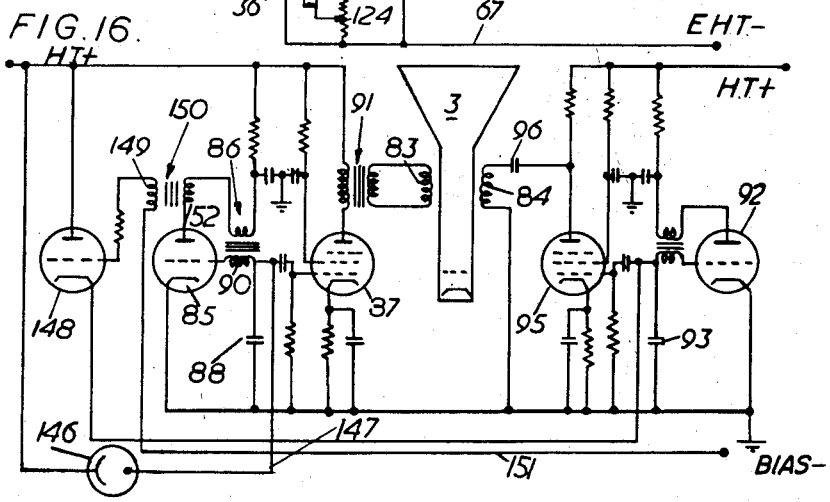

In order that the invention may be clearly understood, some embodiments thereof will now be described, by way of example, with reference to the accompanying diagrammatic drawings, in which:

FIGURE 1 is a schematic illustration of an embodiment of the invention including a scanning cathode ray tube, FIGURE 2 is a circuit diagram of electronic apparatus for producing a modulating signal, FIGURES 3 and 4 illustrate detailed connections in the circuit diagram of FIGURE 2, FIGURE 5 is a circuit diagram of an indicating device for connection to the circuit of FIGURE 2, FIGURE 6 illustrates a display on the face of an analysing cathode ray tube, FIGURES 7 and 8 are representations of selecting screens of varying optical density, FIGURE 9 illustrates a display on the face of a correction cathode ray tube, FIGURES 10 and 11 are graphs illustrative of the density distributions of correction screens, FIGURE 12 is a circuit diagram of time base circuits for the scanning cathode ray tube, FIGURE 13 is a schematic illustration of a second embodiment of the invention, FIGURE 14 is a circuit diagram of another electronic apparatus for producing a modulating signal, FIGURE 15 is a simplified version of the circuit diagram of FIGURE 14, FIGURE 16 is a second embodiment of the time base circuits, and FIGURE 17 is a simplified version of the circuit diagram of FIGURE 15.

In the drawings like reference numerals denote the same or similar parts.

Referring to FIGURE 1 of the drawings, a coloured original 1, which is transparent and is of the kind known as a pure dye image transparency is rigidly supported in any suitable manner, as for example by a rigid frame extending upwards from a base plate or the like, not shown, on which is also mounted a camera 2. A photographic plate is supported in known manner in the camera 2, to be exposed to light transmitted directly from the original.

Pure dye image transparencies are non-light scattering, and a ray of light which is incident normally on one side of the transparency will pass through it without any appreciable change of direction. The original 1 is sequentially scanned by a scanning cathode ray tube 3 which is operable to direct a spot of substantially white light on to the original and which is connected to a supply network, not shown, in known manner to energise the electron gun of the tube. Time base circuits 4, which are described below with reference to FIGURE 12, are provided and are connected to deflector means for the scanning cathode ray tube 3 and are operable to produce a scanning raster on the face of the cathode ray tube. The original 1 is placed flat against the face of the tube 3, and the aperture of the camera 2 is sufficiently small to give no appreciable increase in the effective spot size due to the original being separated from the scanning spot by the thickness of the cathode ray tube face; that is the camera 2 is stopped down to allow only that part of the light which has not undergone any substantial refraction by the screen of the tube to affect the photographic plate in the camera. The operation of the shutter of the camera 2 is synchronised with the movement of the scanning spot of light.

Some of the light transmitted from the original 1 is incident on a lens 5, and the light transmitted by the lens 5 is deflected by a mirror 6 through a lens system 7, which has a stop with a small aperture the function of which is the same as that of the camera 2, stated above. After passing through the lens system 7 the light is incident on a first, a second and a third photoelectric device which form part of a control means, and are shown as photomultiplier tubes 8, 9 and 10 which have respectively associated therewith a blue filter 11, a green filter 12 and a red filter 13. Light transmitted from the original passes through the filters to actuate the photomultiplier tubes, so that each tube receives a sequential light signal representative of a primary colour component of the original. It will be understood that if desired the photoelectric devices may be other than photomultiplier tubes, for example they may be photo-transistors.

The output signals originating from the photomultiplier tubes are transmitted to computer means 14, shown in detail in FIGURES 2, 3, 4 and 5, and which forms the remainder of the control means, on lines 15, 16 and 17.

Due to the thickness of the face of the scanning cathode ray tube 3, the illuminated area of the transparency 1 viewed by the camera 2 at any instant is adjacent to but different from the illuminated area viewed by the photomultiplier tubes 8, 9 and 10, as illustrated by the divergence of the light beams 18 and 19 in FIGURE 1. If the scanning spot is travelling in the direction of the arrow S, the photomultiplier tubes will always receive light from an area on the transparency slightly in advance of the camera, so that a colour and tone corrected modulating signal, which is produced by the circuit 14 and which is transmitted on line 20, for an area on the original will always lead the exposure of a photographic plate in the camera 2 to light transmitted from that area. This time lead can be varied by adjusting the relative positions of the camera 2 and the lens 5, and can be used to compensate for any unwanted time delays in the electronic circuit 14.

The colour and tone corrected modulating signal is transmitted on line 20 to the time base circuits 4 to modulate the speed of scan of the scanning spot on the face of the scanning cathode ray tube 3, thereby to control the amount of light transmitted directly from any area on the original to the photographic plate in the camera 2. The modulating signal is also transmitted to a monitoring cathode ray tube, not shown, so that the amount of correction applied can be observed directly by the operator.

In a three colour printing process employing yellow, magenta and cyan printing inks a corrected colour separation photographic negative for use in the preparation of a plate for printing with yellow ink, hereinafter referred to as the "yellow printer," is produced by exposing a photographic plate in the camera 2 through a blue filter with the circuit 14 producing a yellow colour and tone corrected modulating signal for transmission on line 20. Similarly to produce corrected colour separation photographic negatives for use in the preparation of plates for printing with magenta and cyan inks, hereinafter referred to as the "magenta printer" and the "cyan printer," green and red filters respectively are used with the camera 2 and the circuit 14 produces magenta and cyan colour and tone corrected modulating signals for transmission on line 20.

In a four colour printing process a corrected colour separation photographic negative for use in the preparation of a plate for printing with black ink, hereinafter referred to as the "black printer," is also required, and the circuit 14 then operates to produce a black colour and tone corrected modulating signal.

The circuit diagram of the electronic apparatus which forms the control device for producing the yellow, magenta, cyan and black colour tone corrected modulating signals, is illustrated in FIGURES 2, 3, 4 and 5. Referring to FIGURES 2, 3, 4 and 5, light transmitted from the original is incident through the filters 11, 12 and 13 on the cathodes of the photomultiplier tubes 8, 9 and 10. The anode of each photomultiplier tube is connected to earth through a resistor, and the cathodes of tubes 8 and 9 are connected to variable resistors 21 and 22 which are connected to a line 23 which is connected to the cathode of tube 10 and through a variable resistor 24 to a source of negative E.H.T. potential on line 25.

The variable resistors 21, 22 and 24 are connected for initial adjustment of the negative E.H.T. potential on the cathodes of the photomultiplier tubes 8, 9 and 10, and are used to preset the potentials applied to the photomultiplier tubes to obtain an initial condition of balance thereof to correct for the background tones of a paper on which printing is to be effected. This initial condition of balance is attained when the tubes 8, 9 and 10 give equal signals when they are activated by light transmitted from the paper. The output signals from the first, second and third photomultiplier tubes 8, 9 and 10 are respectively transmitted on lines 15, 16 and 17 to amplifiers 26, 27 and 28 of conventional design. The outputs from amplifiers 26, 27 and 28 are connected to the grids of cathode follows 29, 30 and 31, which transmit the amplified signals on lines 32, 33 and 34.

The lines 32, 33 and 34 are respectively connected to the fixed contacts Y1, M1 and C1 of a first manually-operable four-position switch 35 and to the deflector means of an analysing cathode ray tube 36. Connection is made respectively with the contacts Y1, M1 and C1 when the yellow, magenta and cyan printers are to be produced, and the fourth fixed contact B1 of switch 35, which is contacted when the black printer is to be produced is connected by a mixer 37 to the three lines 32, 33 and 34.

The lines 32, 33 and 34, FIGURE 5 are also respectively connected through resistors 38, 39 and 40 to three of the fixed contacts Y2, M2 and C2 of a second manually-operable four-position switch 41. The fourth fixed contact B2 of the switch 41 is connected by a mixer 42 to the lines 32, 33 and 34. A meter 43 is connected to the movable contact of the switch 41, and to the movable contact of a third manually-operable four-position switch 44, and the four fixed contacts Y3, M3, C3 and B3 of the switch 44 are respectively connected to the movable contacts on potentiometers 45, 46, 47 and 48.

The potentiometers 45, 46, 47 and 48 are connected in parallel between two resistors 49 and 50 which are respectively connected to a source of H.T. potential and to earth. The first, second and third four-position switches 35, 41 and 44 are ganged together for simultaneous operation, and before operation of the apparatus to produce colour separation negatives the potentials on the cathodes of the cathode followers 29, 30 and 31, FIGURE 2, are balanced out under "no signal" conditions, that is with the photomultiplier tubes 8, 9 and 10 not actuated, by selectively setting the switches 35, 41 and 44 in each of the four positions thereof, and for each position of the switches, adjusting the potentiometer 45, 46, 47 or 48 appropriate to that position.

The deflector means of the analysing cathode ray tube 36 comprises two pairs of deflector plates 51, 52 and 53, 54, FIGURES 2 and 3, and the cathode ray tube 36 is connected to a supply network, not shown, in known manner to energise the electron gun of the tube. The third photomultiplier tube 10 is connected through the amplifier 28, cathode follower 31 and line 34 to a plate of each pair of plates, that is to plates 52 and 54; and the first and second photomultiplier tubes 8 and 9 are similarly connected by lines 32 and 33 to the two remaining plates 51 and 53 respectively.

There are thus transmitted to the deflector plates of the analysing cathode ray tube 36 at any instant three signals on lines 32, 33 and 34, representative respectively of the blue, green and red components of the colour of a small area on the original, and it will be understood that for a grey area on the original the amplitudes of the three signals are equal, the cathode ray beam in the tube 36 will not be deflected, and the spot of light which the beam produces on the face of the tube will be stationary in the centre of the face. This is represented in FIGURE 6, which illustrates diagrammatically a display on the face of the tube 36 and the relative positions of the plates 51, 52, 53 and 54.

If, however, the amplitudes of the signals are not equal, the spot of light will take up a different position on the face of the tube, and for each possible colour of an area on the original, the spot of light will assume a definite position on the face of the tube 36. The positions on the face of the tube 36 corresponding to a red, blue, green, yellow, magenta and cyan area on the original are shown in FIGURE 6. As the original is scanned by the scanning spot of light on the face of the scanning cathode ray tube 3, the spot of light on the face of the analysing cathode ray tube 36 will assume sequentially a series of positions.

In order to apply a colour and tone correction to a colour separation photographic negative, the speed of scan of the scanning spot of light on the face of the scanning cathode ray tube 3 is modified by a colour and tone corrected modulating signal transmitted on line 20 to the time base circuits 4, and for the production of any one printer, for example the yellow printer, it is necessary to specify the colours in the original to which a colour and tone correction is to be applied. This is achieved by placing a selecting screen 55, FIGURE 2, in front of the face of the analysing cathode ray tube 36, so that the spot of light on the face of the tube 36 is operable through the screen 55 to actuate a fourth photoelectric device shown as a photomultiplier tube 56, but which, if desired, can be a photo-transistor. The optical density of the selecting screen 55 is predetermined for each area thereon, so that the amount of light transmitted from the face of the tube 36 to the cathode of the fourth photomultiplier tube 56 is determined by the position of the spot of light on the face of the tube 36 and by the optical density of the area on the screen 55 through which light from the spot on the face of the tube 36 passes, so that the screen 55 functions to select those colours to which a correction is to be applied in the production of a corrected colour separation photographic negative. A selecting screen 55 having a different optical density distribution is provided for use in the preparation of each printer.

An example of a selecting screen 55 for use in the production of the yellow printer is illustrated in FIGURE 7. The central area 57 of the screen, which overlies the "grey" position on the face of the analysing tube 36, FIGURE 6, is the least optically dense. The densest area 58 of the screen overlies the "yellow" position on the face of the tube 36, and the areas of the screen of intermediate optical density overlie the positions on the face of tube 36 corresponding to the colours which are to be corrected.

When a yellow area on the original is illuminated by the scanning spot a minimum light signal is transmitted to the fourth photomultiplier tube 56, FIGURE 2. When a grey area on the original is illuminated a maximum light signal is transmitted to the tube 56, and when the colour of the area on the original which is illuminated is in the range blue-magenta-red, a light signal of intermediate strength is transmitted to the tube 56. Colours which fall within this range are those to which correction is to be applied in the production of the yellow printer. As the original is sequentially scanned with the selecting screen 55 for the yellow printer in front of the tube 36, the output signal transmitted from the fourth photomultiplier tube 56 on line 59 will be a colour signal for conversion into a modulating signal.

The output from the fourth photomultiplier tube 56 on line 59 is connected to the cathode of the analysing cathode ray tube 36 by a negative feedback loop which ensures good stability and frequency response and which comprises a first amplifier valve 60, a first potential divider consisting of resistors 61, 62 and 63, and a first cathode follower 64, connected in series. The grid of the cathode follower 64 is connected to a sliding contact on resistor 63, which is preset to determine the standing D.C. bias potential applied to the grid of the cathode follower 64, and a sliding contact on resistor 61 is connected by a line 65 to the deflector means of a correction cathode ray tube 66.

The correction means includes the correction cathode ray tube 66 which is also connected to a supply network, not shown, in known manner to energise the electron gun of the tube. The end of resistor 63 is connected to a negative E.H.T. potential on line 67, and the cathode of the fourth photomultiplier tube 56 and the grid of the analysing cathode ray tube 36 are connected together to a further negative E.H.T. potential on line 68. The anode of the fourth photomultiplier tube 56 is connected to earth through a load resistor, and when the cathode of the photomultiplier tube 56 is illuminated from the analysing cathode ray tube 36 through the selecting screen 55, the anode of the tube 56 will go negative. The anode of the first amplifier valve 60 thus goes positive and a fraction of this positive-going signal is transmitted through the potential divider 61, 62, 63 and the first cathode follower 64 to the cathode of the analysing cathode ray tube 36. The intensity of the spot of light on the face of the tube 36 is thus reduced by a small amount, and a state of balance is achieved in a normal feedback manner.

It will be seen that the two-dimensional display or the face of the analysing tube 36 has been obtained from an input having three variables, and in order to counter any ambiguities which might arise due to this, and in order to obtain a colour and tone correction the correction cathode ray tube 66 is operable through a correction screen 69, the optical density of which is predetermined for each area thereon, to actuate a fifth photoelectric device shown as a photomultiplier tube 70, but which, if desired, may also be a photo-transistor. The form of a correction screen 69 will be described below, by way of example, with reference to FIGURES 9, 10 and 11.

The deflector means for the correction cathode ray tube 66 is shown in FIGURES 2 and 4, and comprises two pairs of deflector plates 71, 72 and 73, 74. The plates 72 and 74 are connected in common and to earth, plate 71 is connected by the line 65 to the output from the fourth photoelectric device 56, and plate 73 is connected by a line 75 to the movable contact of the first four-position switch 35, so that the plate 73 can be connected selectively to the first, second, or third photomultiplier tubes 8, 9 or 10, through one of the lines 32, 33 or 34, or simultaneously to all three photomultiplier tubes through the mixer 37.

The output from the fifth photomultiplier tube 70 is connected to the cathode of the correction cathode ray tube 66 by a negative feedback loop which ensures good stability and frequency response, and which comprises a second amplifier valve 76, a second potential divider consisting of resistors 77, 78 and 79 and a second cathode follower 80. The standing D.C. bias potential on the grid of cathode follower 80 is determined by the position of a sliding contact on resistor 79.

The position of the spot of light on the face of the correction cathode ray tube 66 is determined by the amplitude of the colour signal on line 65, and the tone value of the signal which is selected by operation of switch 35 and which is transmitted on line 75. The optical density of the correction screen 69 is predetermined for each area thereon to give a required colour and tone correction and the correction cathode ray tube 66, correction screen 69, photomultiplier tube 70, and the negative feedback loop operate in the same way as described with reference to the analysing cathode ray tube 36, the selecting screen 55 and the photomultiplier tube 56. The output signal transmitted on to line 20 which is connected to a sliding contact on resistor 77 is the required colour and tone corrected modulating signal which is transmitted to the time base circuits 4, FIGURES 1, 12 and 13, to modulate the speed of scan of the scanning spot on the face of the scanning cathode ray tube 3, and so to control the amount of light incident sequentially on the photographic plate in the camera 2 which, when developed and fixed, gives a corrected colour separation photographic negative.

The production of a corrected colour separation photographic negative for the yellow printer will now be described. A blue filter is used with the camera 2, FIGURE 1, and the switch 35, FIGURE 2, is set in the Y1 position to connect line 75 to line 32. The selecting screen 55 illustrated in FIGURE 7 is placed in front of the face of the analysing cathode ray tube 36, and as stated above, is operable to select colours in the blue-magenta-red range for correction.

When a grey area on an original is illuminated by the scanning spot, a strong signal is transmitted from the fourth photomultiplier tube 56, FIGURE 2, and the positive swing of the anode potential of the first amplifier 60 causes the spot of light on the face of the correction cathode ray tube 66 to be deflected towards the left, as shown in FIGURE 9, which represents diagrammatically the face of the correction cathode ray tube 66. The denser the grey spot on the original, that is the more nearly black, the weaker will be the signal on line 75 from the photomultiplier tube 8, FIGURE 2, which is activated through the blue filter 11, and the spot on the face of the correction tube 66 will be deflected towards the bottom of the face, as indicated by the line D in FIGURE 9. The line D corresponds to the complete grey scale of densities from white to black.

The areas of intermediate optical density of the selecting screen 55 overlie areas on the face of the analysing tube 36 which correspond to colours of the original in the blue-magenta-red range which require correction when the yellow printer negative is being produced. The apparatus is set up so that for these colours the spot of light on the face of the tube 66 will be centrally disposed, and for any one of these colours the scale of density of the colour from white to full saturation is represented by a line E, for example.

When the spot of light on the face of the analysing tube 36 is in the yellow position, a minimum signal is transmitted by the photomultiplier tube 56, and the spot of light on the face of the tube 66 is deflected towards the right, as shown in FIGURE 9 in which the line F represents the scale of density of yellow from white to full saturation.

The optical density of adjoining areas of the correction screen 69 is predetermined to give a required colour and tone correction, as illustrated graphically in FIGURE 10 by plotting the density of colour of each area on the original against the optical density of the correction screen 69 for the three colours represented by lines D, E and F, FIGURE 9. For the grey scale represented in FIGURE 10 by line D1, when the colour is least dense, that is white, the screen 69 has a maximum optical density, and when the colour has saturation density the screen 69 has a minimum optical density. The optical density gradient of the screen 69 along that part thereof which overlies the line D on the face of the tube 66 is therefore such as to give a full range of under-colour removal for the grey scale.

The optical density gradients of the parts of the screen 69 which overlie the lines E and F on the face of tube 66, FIGURE 9, are represented by the lines E1 and F1, FIGURE 10. The line E1 represents one of the colours in the blue-magenta-red range which requires some correction, and the optical density gradient of the screen 69 along the line E1 is appropriate to the required amount of correction. In the case of the line F1 which represents the printing colour, in this case yellow, the optical density of the screen 69, as shown by the line F1, is only sufficient to exercise a tone control and when the original is a transparency to give some contrast reduction, and no colour correction is applied. To produce corrected colour separation negatives for use with different printing colours, or different printing processes it is only necessary to manipulate the switch 35 and to change the selecting screen 55 substituting a screen with a different optical density distribution, which selects the appropriate colours for correction.

The same correction screen 69 is used in the preparation of corrected negatives for the yellow, magenta and cyan printers, but for the production of a negative for the black printer a different correction screen 69 is used. The selecting screen 55 for the black printer is illustrated in FIGURE 8, and has a central area 81 of minimum optical density and a peripheral area 82 of maximum optical density. Therefore when a negative for the black printer is being prepared, only when an area of the original illuminated by the scanning spot is grey or a very weak colour will a light signal be transmitted to the fourth photomultiplier tube 56, FIGURE 2. Although, for the black printer, the grey scale will still correspond to the line D on the face of the correction tube 66, FIGURE 9, a different correction screen 69 is required, and the optical density distribution of this screen is shown by the graphs of FIGURE 11. In FIGURE 11, the density of colour of an area on the original is plotted against the optical density of the screen 69, for the grey scale represented by line D2, and for colours, represented by line F2.

It will be understood that the optical density of the correction screen 69 referred to above is continuously variable over the whole area of the screen, so that a required correction is obtainable depending on the position of the spot of light on the face of the correction tube 66, which is a function of the optical density of the selecting screen 55. The actual optical density distributions on screens 55 and 69 will depend on the printing process being used, and the kind of original being scanned which may be opaque or transparent.

The light signal transmitted through the correction screen 69 activates the fifth photomultiplier tube 70, and the output from the second amplifier 76 on line 20 is a colour and tone corrected modulating signal for transmission to the time base circuits 4.

The circuit diagram of the time base circuits 4 for the scanning cathode ray tube 3 is shown in FIGURE 12.

The deflector means for the scanning cathode ray tube 3 comprises line scan deflector coils 83 and frame scan deflector coils 84, and line and frame time base circuits are respectively connected to the coils 83 and 84. The line time base circuit comprises a first blocking oscillator which includes a triode valve 85, the anode of which is coupled to the grid thereof by a pulse transformer 86. The grid circuit of the triode 85 is coupled to the control grid of a pentode valve 87 which is connected to form a third amplifier. Time base circuit control means formed by a condenser 88 and a discharge resistor 89 therefor form part of the grid circuit of the triode 85, and are both connected to the end of the winding 90 of the transformer 86 opposite to the end thereof which is connected to the grid of the triode 85. The other end of resistor 89 is connected to line 20, FIGURES 2 and 12, and the modulating signal is transmitted on line 20 to resistor 89.

The anode of pentode 87 is inductively coupled by a transformer 91 to the line scan deflector coils 83. A time base waveform is produced in known manner by the first blocking oscillator by the charging of condenser 88 and the discharging thereof through the discharge resistor 89. As the discharge resistor 89 is connected to line 20, the discharging of the condenser 88 will be controlled by the potential on line 20, and when a modulating signal is transmitted on line 20, the discharge of condenser 88 will be controlled by that signal. Hence the shape of the time base waveform which is amplified by pentode 87 and transmitted to the line scan coils 83 through the transformer 91 will be modulated under control of the modulating signal produced by the control means, so that the speed of line scan of the scanning spot of light on the face of the scanning cathode ray tube 3 will be modulated.

The frame time base circuit comprises a second blocking oscillator which includes a triode valve 92, and the construction and operation of the second blocking oscillator is similar to that of the first blocking oscillator. The time base circuit control means also includes a condenser 93 in the grid circuit which discharges through a resistor 94 which is connected to the line 20. The frame time base waveform is therefore also controlled by the modulating signal on line 20, and is amplified by a fourth amplifier which includes a pentode valve 95 the anode of which is capacitively coupled through a capacitor 96 to the frame scan deflector coils 84.

Therefore as the original is scanned by the scanning spot of light on the face of the scanning cathode ray tube 3, the amount of light transmitted from an area on the original to the photographic plate in the camera 2 is modified by varying the speed of scan of the spot of light so that it dwells on the area on the original for a length of time sufficient to expose the photographic plate in such a way that when it is developed and fixed a colour and tone corrected colour separation photographic negative is produced.

As the intensity of the scanning spot of light varies by a very small amount when the speed of scan is modulated, there is no substantial change in the signals transmitted from the photomultiplier tubes 8, 9 and 10 when a correction is applied to light transmitted from any spot on the original. If desirable, however, small variations in the intensity of the scanning spot, due to modulation of the speed of line scan, can be corrected by applying to the control grid of the scanning cathode ray tube 3 at any instant a potential which is proportion to the speed of scan at that instant to vary the intensity of the scanning spot so that it remains substantially constant for every speed of scan.

Although the line and frame time base circuits are described above as comprising blocking oscillators, it will be understood that each blocking oscillator may be replaced, for example, by a Miller integrator or a multivibrator circuit, or by a thyratron oscillator.

A second embodiment of the invention is illustrated schematically in FIGURE 13, and is arranged to scan a transparent original of the kind which tends to be light scattering or which consists, in known manner, of a pure dye image transparency combined with a silver mask. In this embodiment the scanning raster on the face of the scanning cathode ray tube 3 is projected by a lens 97 on to a diffusing screen 98, the transparent original 1 being positioned in contact with the screen 98 as shown in FIGURE 13. With this arrangement there is some loss of light in transmission through the screen 98, thus necessitating a longer exposure of the photographic plate in the camera 2, but it is not necessary to stop down the camera aperture or to provide a stop in the optical system 7, through which light from the original is deflected by a semi-silvered mirror 99 to actuate the photomultiplier tubes 8, 9 and 10, because the scanning spot of light can be focussed on the screen 98 by the lens 97.

As described above with reference to FIGURES 1 to 5, the signals from the photomultiplier tubes 8, 9 and 10 are transmitted to the circuits 14 to produce a colour and tone corrected modulating signal which is transmitted on line 20 to the time base circuits 4 for the scanning cathode ray tube 3, to modulate the speed of scan of the scanning spot on the face of the scanning cathode ray tube 3.

Referring to FIGURE 14 a further embodiment of the computer means for producing colour and tone corrected modulating signals is shown. A number of features of the apparatus illustrated in FIGURE 2 are retained, and light transmitted from an original passes through filters 11, 12 and 13 to activate the photomultiplier tubes 8, 9 and 10 as before.

The screen grids of the amplifiers 26, 27 and 28 are respectively connected to sliding contacts on resistors 100, 101 and 102 which are connected to the H.T. supply line for the amplifiers, and in order to equalise the potentials on the cathodes of the cathode followers 29, 30 and 31 under "no signal" conditions, as referred to above, the switch 35 is selectively set in each of the three positions Y1, M1, and C1 thereof, and the sliding contact 100, 101 or 102 appropriate to each position is adjusted to give identical readings on the meter 43.

In view of the large range of colour density of the average coloured original, it is desirable in some cases to convert the electrical signals originating from the first, second and third photomultiplier tubes 8, 9 and 10 into logarithmic form. To achieve this the amplifiers 26, 27 and 28 may be operated on the bottom bend of their characteristic curves, so that the signals transmitted on lines 32, 33 and 34, represent the logarithm of the signal from the photomultiplier tubes 8, 9 and 10. However, it is preferred to retain the amplifiers 26, 27 and 28 purely as linear amplifiers and to provide logarithm deriving circuits which are operable to convert the output signals from the photomultiplier tubes into logarithmic form.

The line 32, FIGURE 14, which carries the output from the photomultiplier tube 8, is connected to a line 103, and thence to the plate 51 of the deflector means for the analysing cathode ray tube 36, by a logarithm deriving circuit comprising a resistor 104 connected to the line 32 and a diode 105 connected in series with the resistor 104 and to a line 106 which is connected between a sliding contact on a bias resistor 107 and the meter 43. The bias resistor 107 forms with a further resistor 108 a potential divider connected between the H.T. supply line and earth.

The junction of the resistor 104 and the diode 105 is connected to the control grid of an amplifier triode valve 109 the anode of which is connected to line 103. As is well understood the characteristics of a series combination of a resistor and a diode can be used to produce a logarithmic signal, and the signal on line 103 represents the logarithm of the signal on line 32.

In order to generate an accurate logarithmic signal the standing potential on the control grid of the triode valve 109 must be equal to the potential on line 32 under "no signal" conditions. This is achieved by adjustment of the sliding contact on the resistor 107 following adjustment on the contacts on the resistors 100, 101 and 102, until the meter 43 gives a zero reading for each of the positions of the four-position switch 35.

Similarly, a logarithm deriving circuit comprising a resistor 110, a diode 111 and a triode valve 112 connects line 33 to a line 113, and a logarithm deriving circuit comprising a resistor 114 a diode 115 and a triode valve 116 connects line 34 to a line 117. Line 113 is connected to the plate 53 of the deflector means of the analysing tube 36, and the line 117 is connected to both plates 52 and 54 of the deflector means.

The cathodes of the triode valves 109, 112 and 116 are connected in common and have a common cathode load 118 which is connected to earth. The cathodes are also connected to the H.T. supply line through a resistor, so that a positive bias is maintained on the cathodes.

The logarithmic signals on lines 103, 113 and 117 are each a function of the brightness of the scanning spot of light which scans the original, and of the density of one of the primary colour components of the original. By the action of the deflector means of the analysing tube 36 the logarithm signals are subtracted from each other so that the position of the spot of light on the face of the tube 36 is determined not by the difference between electrical signals as with the apparatus of FIGURE 2, but by the ratio of the output electrical signals originating from the photomultiplier tubes 8, 9 and 10. Since the components of each of the logarithmic signals on lines 103, 113, 117 determined by the intensity or brightness of the scanning spot are equal they will cancel out in the tube 36, so that the position of the spot of light on the face of the tube 36 is dependent only on the hue and density of the colour of the area of the original being illuminated by the scanning spot.

Thus the output from the fourth photomutiplier tube 56 on line 59 is a function only of the hue and colour density of the area of the original being illuminated. The line 59 is connected to one control grid of a first double triode push-pull amplifier 119 and the other control grid of this amplifier is connected to a sliding contact on a resistor 120 which provides a standing bias potential on that grid. Outputs from the two anodes of the amplifier 119 are taken on lines 121 and 122 which are respectively connected to plates 71 and 72 which comprise one pair of plates of the deflector means of the correction cathode ray tube 66. The line 121 is connected by a series resistor chain 123 and 124 to the line 67 which is for connection to a source of negative E.H.T. potential. A sliding contact on resistor 124 is connected to the cathode of the analysing cathode ray tube 36, the control grid of which is connected to the line 67. Negative feedback is thus provided from the fourth photomultiplier tube 56 back to the analysing tube 36.

The plates 73 and 74, being the other pair of plates of the deflector means of the correction cathode ray tube 66, are connected to outputs from a second double triode push-pull amplifier 125. That is plate 73 is connected by a line 126 to one anode of the amplifier and plate 74 is connected by a line 127 to the other anode. One grid of the amplifier 125 is connected to a sliding contact on a resistor 128 to provide a standing bias potential on that grid, and the other grid is connected to the junction of a resistor 129 and a diode 130 which are connected in series between the movable contact of the four-position switch 35 and the line 106. The resistor 129 and diode 130 together form a logarithm deriving circuit so that the potentials applied to the plates 73 and 74 of the correction tube 66 are also in logarithmic form. This results in a more evenly spaced display on the face of the tube 66 so that tone correction by means of the correction screen 69 is facilitated.

Negative feedback is provided in the circuit of the correction cathode ray tube 66 by the connection of the cathode of the tube 66 to a sliding contact on a resistor 131 which is connected through another resistor 132 to one anode 133 of a driver amplifier double triode valve 134 which receives the output signal from the fifth photomultiplier tube 70 on line 135. The anode 133 is connected to the resistor 132 through a further resistor 136 which has a sliding contact connected to the other control grid of the amplifier 134. The anode associated with this other control grid has the line 20 connected there to.

Colour selection, and colour and tone correction are respectively effected by means of the selecting screen 55 and the correction screen 69 co-operating with the analysing cathode ray tube 36 and the correction cathode ray tube 66 respectively in the same way as described herein with reference to FIGURES 6 to 11. And the colour and tone corrected modulating signal is produced on line 135 for amplification by the driver amplifier valve 134 and application to the time base circuits on line 20.

A simplified version of the computer means for producing a colour and tone corrected modulating signal is shown in FIGURE 15, and is for use when the degree of tone correction required is small, that is for use in reproduction systems which possess an inherently good tone response. The correction cathode ray tube 66 and its associated circuits including the fifth photomultiplier tube 70 are no longer necessary, but the logarithm deriving circuits and analysing cathode ray tube 36 with its associated circuits as shown in FIGURE 14 are retained.

In this simplified circuit the anode of the fourth photomultiplier tube 56 is connected through a load resistor 137 to a source of negative bias potential by line 138. The anode is also connected by line 139 to the control grid of an amplifier valve 140 the anode of which is connected by resistors 123 and 124 back to the cathode of the analysing cathode ray tube 36 to provide the negative feedback loop.

The anode of the fourth photomultiplier tube 56 is also connected by a line 141 to the control grid of a driver valve 142 which is a tetrode valve.

The mixer 37 which mixes the signals on the lines 32, 33 and 34, as well as being connected to the fixed contact B1 of the first four-position switch 41 is also connected to one end of the resistor 129 of the logarithm deriving circuit which comprises the resistor 129 and the diode 130. The output taken from the junction of the resistor 129 and the diode 130 is the logarithm of the comprehensive signal derived from the output signals from the first, second and third photomultiplier tubes 8, 9 and 10, and this logarithmic signal is fed to the control grid of an amplifier triode valve 143. The resistors 129, diode 130 and triode valve 143 together form part of a grey-scale correction means and an output from the anode of the valve 143 is connected to three fixed contacts Y2, M2 and C2 of a fourth four-position switch 144, the movable contact 145 of which is connected to the screen grid of the driver tetrode valve 142. The fourth fixed contact B2 of the switch 144 is connected through a resistor to the H.T. supply line. The first and fourth four-position switches 35 and 144 are ganged together for simultaneous operation.

Thus when producing corrected colour separation photographic negatives for the yellow, magenta and cyan printers the logarithmic comprehensive signal fed to the screen grid of the driver valve 142 is modified by the colour signal derived from the fourth photomultiplier tube 56 to produce a grey-scale correction signal and when a negative for the black printer is being produced the contact 145 of the fourth switch 144 contacts the fourth fixed contact B2 and no signal is fed to the screen grid of the valve 142, an appropriate fixed potential being supplied to the screen grid by the connection thereof to the H.T. supply line through a resistor.

As described above with reference to FIGURE 15 a colour signal transmitted on line 141 from the photomultiplier tube 56 is dependent only on the hue and colour density of the original. Consider the scanning of grey areas on the original, that is the grey scale of the original; the driver valve 142 is normally biased to cut-off by a combination of a negative bias applied to the control grid thereof from line 138, and a minimum screen grid potential which is obtained when a maximum signal is received from the photomultiplier tubes 8, 9 and 10 corresponding to zero density of the original. As the scanning spot travels down the grey-scale from zero density towards black on the original the screen potential of the valve 142 rises and the current flowing through the valve 142 consequently increases giving a decrease in the speed of scan of the scanning spot.

When scanning coloured areas on the original the colour signal on line 141 is thus combined with the grey-scale signal applied to the screen grid of the valve 142 and the desired modulating signal is developed in the anode circuit of the valve 142 for transmission on line 20.

The analysing cathode ray tube 36 with its selecting screen 55 gives colour correction. A limited amount of tone correction is also possible with is apparatus by arranging for a variable density selecting screen 55 which in addition to selecting colours has some of the functions of the correction screen 68 of FIGURES 2 and 14. Further some tone correction is possible by predetermining the form of the signal applied to the screen grid of the driver valve 142. In the particular embodiment of FIGURE 15 there is shown a logarithm deriving circuit for determining the form of this signal but it will be appreciated that if desired this signal may have a form other than logarithmic and this form would be obtained by a particular construction of the grey-scale correction means.

A second embodiment of the time base circuits for the scanning cathode ray tube 3 is shown in FIGURE 16. The discharge path for the condenser 88 of the line time base blocking oscillator is formed by a discharge photoelectric device 146 which is connected to the H.T. supply line, and by a line 147 to the end of the winding 90 of the transformer 86 opposite to the end connected to the control grid of the triode valve 85.

The discharge path for the condenser 93 of the frame time base blocking oscillator is a triode valve 148 the anode of which is connected to the H.T. supply line and the cathode of which is connected to the condenser 93. The control grid of the triode valve 148 is connected to one end of a secondary winding 149 of a pulse transformer 150 and the other end of the secondary winding 149 is connected to a negative bias potential source by a line 151. The primary winding 152 of the pulse transformer 150 is connected in series with one of the windings of the pulse transformer 86.

In order to relate the speed of scan of the frame time base circuit in a more definite manner to the speed of scan of the line time base circuit than is shown in FIGURE 12, the frame time base condenser 93 is discharged in steps through the triode 148 which is normally biased to cut-off by the bias potential on line 151. Pulses generated by the fly-back of the line time base circuit are transmitted through the pulse transformer 150 to the control grid of the triode valve 148 and the valve 148 conducts for the duration of the fly-back pulses so that the condenser 93 is discharged by a small amount during each fly-back of the line time base circuit.

The effective resistance of the discharge photoelectric device 146 will vary in dependence on the amount of light falling on the cathode thereof. The modulating signal generated in the control means described herein with reference to FIGURE 2, FIGURE 14, or FIGURE 15 may be used to modulate the intensity of a light source, not shown, and light from that source may be incident on the cathode of the device 146 so that the resistance of the device 146 varies with the variation of the modulating signal. However, it is preferred to connect the anode of fifth photomultiplier tube 70 in FIGURES 2 and 14 to the line 147, FIGURE 16, so that the condenser 88 is discharged through the effective resistance of the tube 70 which is varied by the light incident thereon from the spot of light on the face of the correction cathode ray tube 66 through the correction screen 69.

For use with the time base circuits illustrated in FIGURE 16, the apparatus of FIGURE 15 may be further simplified as illustrated in FIGURE 17. The line 147 is connected to the final secondary cathode of the fourth photomultiplier tube 56, and the anode load 137 of the tube 56 is connected to the junction of the resistor 129 and diode 130 which together form a logarithm deriving circuit. The resistor 129 is also connected to the movable contact of switch 144, the fixed contacts Y2, M2 and C2 of which are connected to the mixer 37, and the fixed contact B2 of which is isolated.

The anode of the fourth photomultiplier tube 56 is also connected by line 139 to one grid of a double triode amplifier 140, and the first anode associated with that grid is connected to the resistor chain 123, 124.

As the logarithm of the comprehensive signal is fed to the anode of the tube 56 when the switch 144 is in the Y2, M2 or C2 position thereof, a grey-scale signal is developed in the tube 56. When a black area on an original is being scanned, the output from the mixer 37 is a minimum and the first anode of the amplifier 140 has its highest positive swing which is transferred to the cathode of the analysing cathode ray tube 36 by the resistors 123, 124. This reduces the brightness of the spot of light on the face of the tube 36, and the current through the photomultiplier tube 56 is reduced. This reduction slows the rate of discharge of the condenser 88 so that the speed of line scan is reduced thereby giving an effective increase in exposure of the photographic plate in the camera to give grey-scale correction.

It will be apparent that the circuits described herein with reference to FIGURES 14 and 15 may be used either with the scanning means described with reference to FIGURE 1 or that described with reference to FIGURE 13 and that the time base circuit of FIGURE 16 can be used to operate the deflection means of the scanning cathode ray tube 3 in either of the embodiments of FIGURES 1 and 13.

Although in the embodiment described with reference to FIGURE 13 a cathode ray tube has been shown for scanning a transparent original only, it will be apparent that corrected colour separation photographic negatives can also be produced from opaque originals using a scanning cathode ray tube by projecting a scanning raster on to an opaque original and activating the photomultiplier tubes 7, 8 and 9 with light reflected from the original.

It will also be apparent that the photographic colour reproduction apparatus described herein can be used for reproducing colour transparencies or for making corrected colour prints directly by exposing colour transparency material or photographic colour print material directly in the camera, giving three consecutive exposures each through the appropriate filter. The form of the selecting and correction screens 55 and 69 used is evaluated to give the required corrective responses for the photographic colour material being used.

I claim:

1. Photographic colour reproduction apparatus, comprising a scanning cathode ray tube including means for developing a spot of substantially white light on the face of the tube and means operable to deflect said spot of light, a time base circuit connected to the deflector means and operable to generate line and frame time base waveforms to control the scanning of a raster on the face of the tube by said spot of light for the illumination of a coloured original, control means in the time base circuit operable to modulate the speed of scan of the raster by controlling the shape of the line and frame time base waveforms, a first, a second and a third photoelectric device having respectively associated therewith a blue, a green and a red filter through which light transmitted form an original as a result of the scanning thereof passes to activate said photoelectric devices, an analysing cathode ray tube having deflector means connected to the photoelectric devices and responsive to electric signals originating as outputs from said photoelectric devices to determine a sequence of positions of a spot of light on the face of said analysing tube according to the colours of areas of the original scanned in sequence, a fourth photoelectric device arranged to receive light from said spot of light and operable thereby to produce a colour signal, a selecting screen interposed between the analysing cathode ray tube and the fourth photoelectric device and having a predetermined optical density for each area thereon to select colours for correction by varying the intensity of the light received by the fourth photoelectric device according to the position of the spot of light on the face of the analysing tube, and correction means connected to the fourth photoelectric device and to the time base circuit control means and operable to convert the colour signal into a colour and tone corrected modulating signal for transmission to said time base circuit control means to modulate the speed of scan of the raster thereby to apply a colour and tone correction to light transmitted from the original.

2. Apparatus according to claim 1, wherein the deflector means for the analysing cathode ray tube comprises two pairs of deflector plates, one of said first, second and third photoelectric devices is connected to a plate of each pair of plates, and the other two of said first, second and third photoelectric devices are respectively connected to the two other plates.

3. Apparatus according to claim 2, wherein the correction means includes a driver valve the control grid of which is connected to the output from the fourth photoelectric device, and a grey-scale correction circuit connected to the outputs from the first, second and third photoelectric devices to receive a compresensive signal representative of the colour density and the grey-scale of the original, said grey-scale correction circuit having an output connected to three fixed contacts of a fourth four-position switch the movable contact of which is connected to the screen grid of the driver valve to transmit thereto a grey-scale corrected comprehensive signal, whereby the colour signal output from the fourth photoelectric device is modified by the grey-scale corrected comprehensive signal to produce the modulating signal.

4. Apparatus according to claim 3, wherein the outputs from the first, second and third photoelectric devices are connected to the deflector means of the analysing cathode ray tube by logarithm deriving circuits, and the grey-scale correction circuit includes a logarithm deriving circuit, whereby signals fed to the deflector means of the analysing cathode ray tube and to the screen grid of the driver valve are in logarithmic form.

5. Apparatus according to claim 4, wherein each logarithm deriving circuit includes a resistor and a diode connected in series therewith.

6. Apparatus according to claim 2, wherein the correction means includes a correction cathode ray tube whose deflector means is connected to the fourth photoelectric device and to said first, second and third photoelectric devices, said correction tube deflector means being responsive to a colour signal and to an output signal from said first, second and third photoelectric devices to determine the position of a spot of light on the face of the correction tube, a first four-position switch connected to the first, second and third photoelectric devices and to said deflector means and operable to connect selectively or simultaneously said first, second and third photoelectric devices to said deflector means, a fifth photoelectric device arranged to receive light from the spot of light on the face of the correction tube and operable thereby to porduce the modulating signal, and a correction screen interposed between the correction tube and the fifth photoelectric device and having a predetermined optical density for each area thereon to apply a colour and tone correction by varying the intensity of the light received by the fifth photoelectric device according to the position of the spot of light on the face of the correction tube.

7. Apparatus according to claim 6, wherein the deflector means of the correction cathode ray tube comprises two pairs of deflector plates, one pair of plates being connected to outputs from a first push-pull amplifier which is connected to the fourth photoelectric device, and the other pair of plates being connected to outputs from a second push-pull amplifier which is connected to the movable contact of the first four-position switch, three fixed contacts of which are respectively arranged to receive electrical signals originating as outputs from the first, second and third photoelectric devices, and the fourth fixed contact of which is arranged to receive electrical signals originating as outputs from the first, second and third photoelectric devices.

8. Apparatus according to claim 7, wherein the outputs from the first, second and third photoelectric devices are connected to the deflector means of the analysing cathode ray tube by logarithm deriving circuits, and the movable contact of the first four-position switch is connected to the second push-pull amplifier by a logarithm deriving circuit, said logarithm deriving circuits being operable to convert the output signals from the photoelectric devices into logarithmic form.

9. Apparatus according to claim 8, wherein each logarithm deriving circuit includes a resistor and a diode connected in series therewith.

10. Apparatus according to claim 6, wherein the deflector means for the correction cathode ray tube comprises two pairs of deflector plates, two plates, one from each pair, being connected in common, one of the other two plates being connected to the output from the fourth photoelectric device, and the remaining plate being connected to the movable contact of the first four-position switch, three fixed contacts of which are respectively connected to outputs from the first, second and third photoelectric devices, and the fourth fixed contact of which is connected to outputs from the first, second and third photoelectric devices.

11. Apparatus according to claim 10, wherein a first amplifier valve is connected to the output from the fourth photoelectric device, a first cathode follower is connected to the cathode of the analysing cathode ray tube and a first potential divider connects the first amplifier valve to the first cathode follower to provide negative feedback to the analysing tube, and said one of the other two plates of the correction tube deflector means is connected to a sliding contact on said first potential divider.

12. Apparatus according to claim 11 wherein a second amplifier valve is connected to the output from the fifth photoelectric device, a second cathode follower is connected to the cathode of the correction tube and a second potential divider connects the second amplifier valve to the second cathode follower to provide negative feedback to the correction tube and the time base circuit control means is connected to a sliding contact on the second potential divider.

13. Apparatus according to claim 12, wherein the deflector means for the scanning cathode ray tube comprises line scan deflector coils and frame scan deflector coils and the time base circuit comprises a line time base and a frame time base which are respectively connected to the line scan deflector coils and the frame scan deflector coils.

14. Apparatus according to claim 13, wherein the line and frame time base circuits respectively include a first and a second blocking oscillator which are respectively connected to the line scan and frame scan deflector coils.

15. Apparatus according to claim 14, wherein the first blocking oscillator is inductively coupled to the line scan deflector coil, and the second blocking oscillator is capacitively coupled to the frame scan deflector coil.

16. Apparatus according to claim 15, wherein the time base circuit control means includes a condenser and a discharge circuit in the grid circuits of both blocking oscillators, and at least one of the discharge circuits is connected to the sliding contact on the second potential divider.

17. Apparatus according to claim 16, wherein each discharge circuit is formed by a discharge resistor which is connected to the sliding contact on the second potential divider.

18. Apparatus according to claim 16, wherein a discharge photoelectric device is connected to the condenser of the line time base blocking oscillator and forms the discharge path for said condenser, and the discharge path for the condenser of the frame time base blocking oscillator is a triode valve which is connected to the line time base blocking oscillator for control thereby.

19. Photographic colour reproduction apparatus comprising a scanning cathode ray tube including means for developing a spot of substantially white light on the face of the tube and means operable to deflect said spot of light, a time base circuit connected to the deflector means and operable to generate line and frame time base waveforms to control the scanning of a raster on the face of the tube by said spot of light for the illumination of a coloured original, control means in the time base circuits operable to modulate the speed of scan of the raster by controlling the shape of the line and frame time base waveforms, photoelectric devices each responsive to one of the primary colour components of light transmitted from the original as a result of the scanning thereof, a colour analysing tube connected to the photoelectric devices and responsive to output signals from the photoelectric devices to indicate colours of areas scanned in sequence as a sequence of positions of an electronic beam, sensing means responsive to said sequence of positions of said beam to produce a sequential colour signal representative of colours selected for correction, and correction means connected to the sensing means and to said time base circuit control means and operable to convert said colour signal into a colour and tone correction signal for transmission to the time base circuit control means to modulate the speed of scan of the raster thereby to apply a colour and tone correction to light transmitted from the original.

20. Apparatus according to claim 19, wherein the deflector means for the scanning cathode ray tube comprises line scan deflector coils and frame scan deflector coils and the time base circuit comprises a line time base circuit and a frame time base circuit which are respectively connected to the line scan deflector coils and the frame scan deflector coils.

21. Apparatus according to claim 20, wherein the line and frame time base circuits respectively include a first and a second blocking oscillator which are respectively connected to the line scan and frame scan deflector coils.

22. Apparatus according to claim 21, wherein the first blocking oscillator is inductively coupled to the line scan deflector coil, and the second blocking oscillator is capacitively coupled to the frame scan deflector coil.

23. Apparatus according to claim 22, wherein the time base circuit control means includes a condenser and a discharge circuit in the grid circuits of both blocking oscillators and at least one of the discharge circuits is connected to the computer means.

24. Apparatus according to claim 23, wherein each discharge circuit is formed by a discharge resistor which is connected to the computer means.

25. Apparatus according to claim 23, wherein the computer means includes a discharge photoelectric device which is connected to the condenser of the line time base blocking oscillator and which forms the discharge path for said condenser, and the discharge path for the condenser of the frame time base blocking oscillator is a triode valve which is connected to the line time base blocking oscillator for control thereby.

References Cited in the file of this patent

UNITED STATES PATENTS

| | | |
|---|---|---|
| 2,480,425 | Simmon | Aug. 30, 1949 |
| 2,499,039 | Simmon | Feb. 28, 1950 |
| 2,565,399 | Simmon | Aug. 21, 1951 |
| 2,612,614 | Amdursky et al. | Sept. 30, 1952 |
| 2,740,828 | Haynes | Apr. 3, 1956 |
| 2,757,571 | Loughren | Aug. 7, 1956 |
| 2,842,610 | Crosfield et al. | July 8, 1958 |
| 2,912,487 | Horsley | Nov. 10, 1959 |
| 2,927,520 | Craig | Mar. 8, 1960 |

FOREIGN PATENTS

| | | |
|---|---|---|
| 701,884 | Great Britain | Jan. 6, 1954 |
| 546,375 | Italy | July 18, 1956 |